(12) United States Patent
Herren

(10) Patent No.: US 6,487,867 B1
(45) Date of Patent: Dec. 3, 2002

(54) COLLECTION PAN TREATMENT APPARATUS

(76) Inventor: Michael A Herren, 603 W. Elizabeth St., Sulphur, LA (US) 70663

( * ) Notice: Subject to any disclaimer, the term of this patent is extended or adjusted under 35 U.S.C. 154(b) by 0 days.

(21) Appl. No.: 10/135,129

(22) Filed: Apr. 29, 2002

(51) Int. Cl.[7] ............................................. F25D 21/00
(52) U.S. Cl. .......................... 62/150; 62/126; 62/92; 62/272; 62/285
(58) Field of Search .......................... 62/150, 126, 92, 62/272, 285

(56) References Cited

U.S. PATENT DOCUMENTS 6,182,453 B1 * 2/2001 Frosberg .................... 62/125
6,213,002 B1 * 4/2001 Batten et al. ................ 99/340
6,261,462 B1 * 7/2001 Batten ........................ 210/739
6,297,871 B1 * 10/2001 Hagiwara .................... 355/30
2001/0019399 A1 * 9/2001 Hagiwara .................... 355/30

* cited by examiner

Primary Examiner—William C Doerrler
Assistant Examiner—Mark Shulman
(74) Attorney, Agent, or Firm—Goldstein & Lavas, P.C.

(57) ABSTRACT

An automated apparatus is provided for periodically transferring a pre-selected volume of treatment liquid to a collection pan in order to treat and prevent the clogging of the collection pan. The system includes a treatment liquid reservoir, at least one fluidic coupling, and a structure for enabling the periodic transfer of the volume of treatment liquid from the treatment liquid reservoir to the collection pan by way of the fluidic couplings, causing a treating of the collection pan.

7 Claims, 6 Drawing Sheets

COLLECTION PAN TREATMENT APPARATUS

TECHNICAL FIELD

The present invention relates most generally to moisture and water collection system cleaning and servicing apparatus. More particularly, the invention provides an electromechanical arrangement for periodically and automatically servicing a collection pan, and possibly other associated structures, of an apparatus such as air-conditioning system, which can become clogged by algae and other contaminants.

BACKGROUND ART

Ubiquitous air conditioning apparatus and sub-systems, along with related equipment, represent critical components in both commercial and residential environmental control systems. Long term operation of such systems, with a minimal need for servicing, is certainly desirable. During times of high heat and humidity, many individuals including customers, clients, patrons, and even friends and family, expect to find climate controlled and regulated interior environments. This is certainly the case when considering air conditioning and dehumidifier systems found, for example, in restaurants, retail outlets, and hotels.

In locations where air conditioning (AC) equipment is in constant or near constant use, the need for servicing increases. For example, a common problem known to skilled persons is associated with the need to drain off moisture collected during the operation of an AC unit. This moisture, which collects through a condensation process as air is cooled, is typically collected using a collection pan structure, which may also be termed a reservoir or drain pan. As the condensed fluid builds up, excess amounts are passed to a drain tube or line that is employed to guide this fluid from the collection pan to a remote discharge location. However, this moisture and fluid can, in time, lead to a build up of algae and other contaminants. For example, in locations where an AC unit is heavily used, a collection pan and or drain line will typically develop a significant build up of algae and associated contaminants that can clog the drain collection and discharge system. It may be noted that a clogging up of the collection pan and or drain line can result in costly water damage due to an excessive build up and overflow of condensed fluid. As such, an AC system that is otherwise capable of problem free operation for long intervals of time, may require costly and periodic servicing just to clean or clear items such as collection pans, drain lines, etc.

Therefore, skilled individuals will appreciate a need for efficient, simple, and effective means for periodically and automatically cleaning and or breaking up contaminants (e.g., algae) that have built up in the aforementioned structures of an AC unit. A full understanding of the present invention, including an understanding of a number of capabilities, characteristics, and associated novel features, will result from a careful review of the description and figures of several preferable embodiments provided herein. Attention is called to the fact, however, that the drawings and descriptions are illustrative only. Variations and alternate embodiments are contemplated as being part of the invention, limited only by the scope of the appended claims.

SUMMARY OF THE INVENTION

In accordance with the present invention, a treatment apparatus is structured for periodically transferring and delivering a pre-selected volume of treatment liquid from a treatment liquid reservoir to a fluid collection pan. At least one delivery tube is provided to support the delivering of the treatment liquid to the collection pan. A means is further included for enabling a controlled and periodic transfer, at pre-selected temporal intervals, of a pre-selected volume of treatment liquid from the treatment liquid reservoir to the collection pan by way of the delivery tube(s). It may be noted that the particular treatment liquid employed may vary, as determined by the apparatus associated with the collection pan being treated. For example, the treatment liquid may be provided as an algaecide when the collection pan is associated with the evaporator coil of an air conditioning system.

Preferred embodiments of the present invention may include a solenoid valve, which is responsive to a timer and control unit. The solenoid valve may be configured to be energized by the timing and control unit when a volume of treatment liquid is to be transferred. As such, the flowing of treatment liquid may be due to one or more of the following:

a) the treatment liquid reservoir being pressurized such that when the solenoid valve is actuated, fluid flows from the pressurized treatment liquid reservoir to the collection pan; and b) elevating the treatment liquid reservoir with respect to the collection pan, thereby causing a gravity assisted feeding of the treatment liquid when the solenoid valve is actuated.

Other preferred embodiments of the present invention may be configured with a pump unit that is responsive to the timer and control unit such that periodically, at predetermined intervals, the timer and control unit energizes the pump unit, causing a pre-selected volume of treatment liquid to be transferred from the treatment liquid reservoir into the collection pan.

It may be further noted that embodiments of the invention may include a treatment liquid reservoir configured with a low liquid level detector that is preferably operatively coupled to the timer and control unit. When the low liquid level detector indicates to the timer and control unit that a volume of treatment liquid remaining in the treatment liquid reservoir has reached a pre-selected minimal level, actions may be taken for causing a remote location to be contacted to request a refilling of the treatment liquid reservoir.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows.

| Partial List Of Reference Numerals | |
|---|---|
| 10 | heating and air conditioning apparatus |
| 12a, 12b | treatment apparatus |
| 18 | collection pan or drain pan |
| 19 | (condensed or condensational) fluid |
| 20 | drain tube or drain line |
| 20a | first end of drain tube 20 |
| 24a, 24b | fluidic coupling |
| 28 | blower and heating assembly |
| 30 | treatment liquid reservoir |
| 30a | filler port |
| 30b | pressurizing port or valve |
| 34 | low liquid level detector |
| 36 | heat exchanger assembly |
| 36a, 36b | (pressurized) fluidic coupling |
| 38 | air distribution means |
| 40 | pump |
| 50 | timer and control unit |
| 50a–50d | signals (operative couplings) |
| 60 | communication module |
| 70 | in-line coupling structure |
| 72 | manual isolation valve |
| 74 | service valve |
| 76 | releasable coupling means |

DETAILED DESCRIPTION AND MODES OF THE INVENTION

It is important to establish the definition of several descriptive terms and expressions that will be used throughout this disclosure. The terms 'coupled', 'operatively coupled', and equivalents, may be assumed to indicate the functional and or operational connection of one device or module to another, either directly or with one or more other devices or modules interposed. A functional or operational connection being required to deliver, receive, or more generally enable information including signals, data values, commands, etc., to be exchanged between one or more respective items, devices, or modules. Accordingly, the terms coupled, operatively coupled, and the like, are to be considered synonymous, and somewhat broadly defined within the context in which they are employed. The terms 'fluidically coupled' and 'fluidic coupling' are to be defined as the necessary conduits, couplings, tubing, fluidic connections, and the like, possibly including in-line items such as a pump, check valve, and or solenoid valve, which may be employed for controlling a transfer of a volume of treatment liquid from a treatment liquid reservoir to a collection pan. The terms 'heat exchanger' and 'heat exchanger assembly' are also to be broadly defined, and as employed within the context of this disclosure may be assumed to include a variety of heat exchanger assemblies wherein a coil structure is included that interacts with a passing or flowing volume of air. This interaction, wherein the volume of air is passed through and contacts a coil structure (and typically finned portions fixed thereto) causes a thermal transfer between the volume of air and a fluid flowing in a gaseous or liquid state through the coil structure. Common examples of heat exchangers contemplated as being within the scope of the invention that are configured having coil and tubed structures include automotive radiators, air conditioner (AC) evaporator coil assemblies, and AC condenser coil assemblies, reheat coils, etc. The term 'treatment liquid' is to be defined as including any liquid, that may be applied to a collection pan (and possibly indirectly to a drain line) for treating, cleaning, clearing, dissolving, or more generally causing a breaking down of contaminants situated therein. As such, typical treatment liquids may include cleaners, algaecides, acidic solutions, etc. Other important terms and definitions will be provided as they are needed, to properly and concisely define the present invention and its associated novel characteristics and features.

Figure 1:
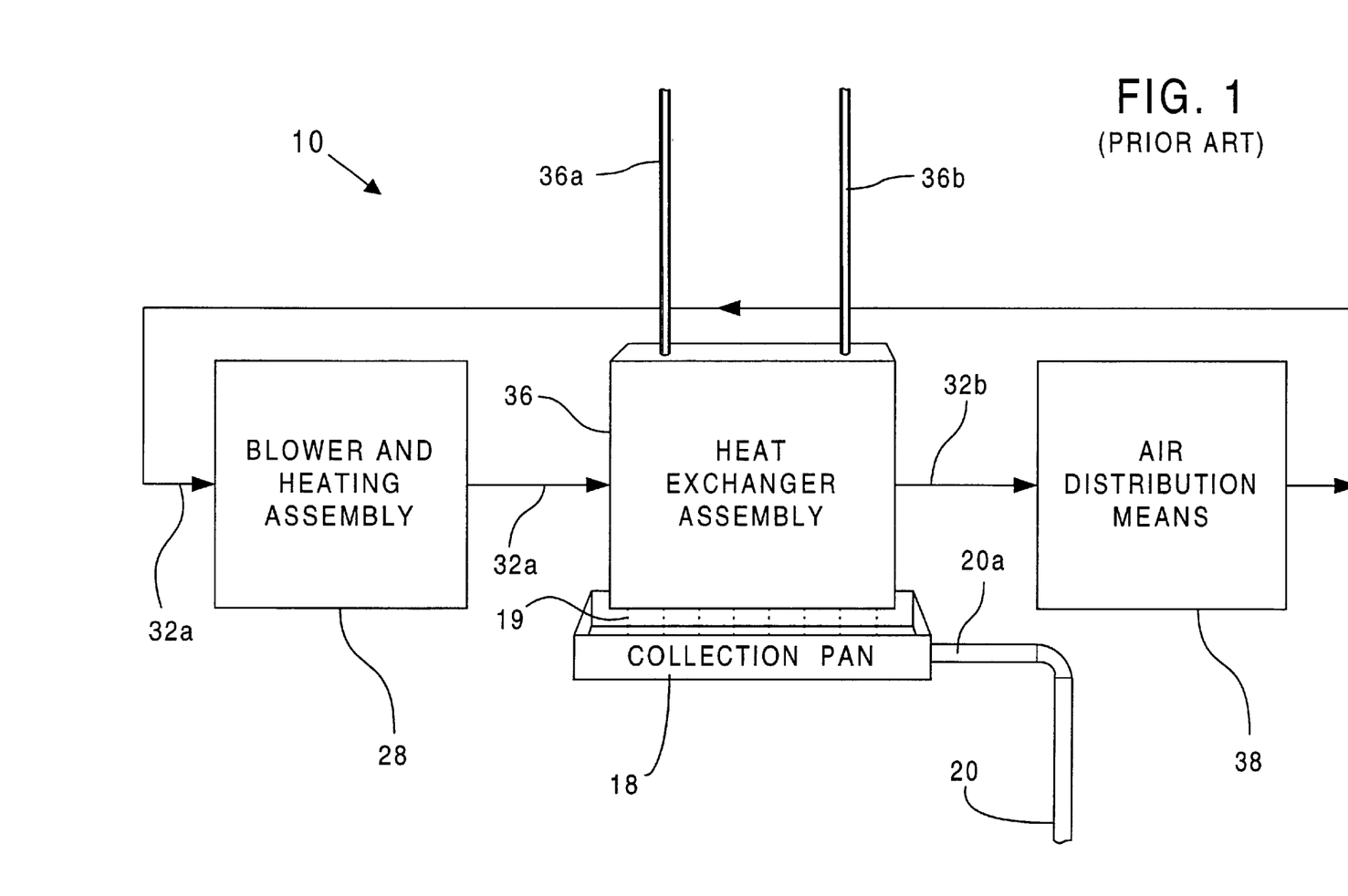
FIG. 1 provides a high level conceptual view of a prior art heat exchanger assembly and apparatus with which the present invention may be utilized.

Referring now to the drawings, FIG. 1 provides a high level conceptual block diagram of a common heating and air conditioning apparatus 10 with which the present invention may be utilized. The prior art system depicted includes a blower and heating assembly 28 that receives an air flow 32a to be heated or cooled. The air flow 32a then enters or passes through an heat exchanger assembly 36, and leaves as air flow 32b. Air flow 32b is then coupled to an air distribution means 38, which delivers the heated or cooled air, typically to a commercial or residential space. Such a space may be said to be climate controlled. Subsequently, air flow 32b is 'recollected' and again coupled to the blower and heating assembly 28 as air flow 32a. As further illustrated in FIG. 1, a collection pan 18 may be provided under (or as a portion of) the heat exchanger assembly 36. As fully understood by skilled individuals, when cooling warm and humid volumes of air, moisture condenses and drips from an evaporator coil (not explicitly illustrated) that is provided within the heat exchanger assembly 36. As can be seen in FIG. 1, this moisture, which drips as condensational or condensed fluid 19, must be collected and guided to a discharge location. Suitable discharge locations are typically to exterior locations of a building, or alternately a drain line of a building's plumbing system.

Accordingly, a drain tube 20 is coupled to the collection pan 18 to receive a flow of condensed fluid 19 for discharging purposes. As illustrated in FIG. 1, a typical drain tube 20 will have a first end 20a arranged to receive the condensed fluid 19. It may be noted that a drain tube 20 is often provided as a ⅝ to ¾ inch tube, and may include a trap structure (not illustrated). As discussed above, the collecting of condensed fluid 19 can result in a build up of contaminants such as algae that eventually clog the collection pan 18 and possibly the drain line 20, especially at the first end 20a.

Figure 2:
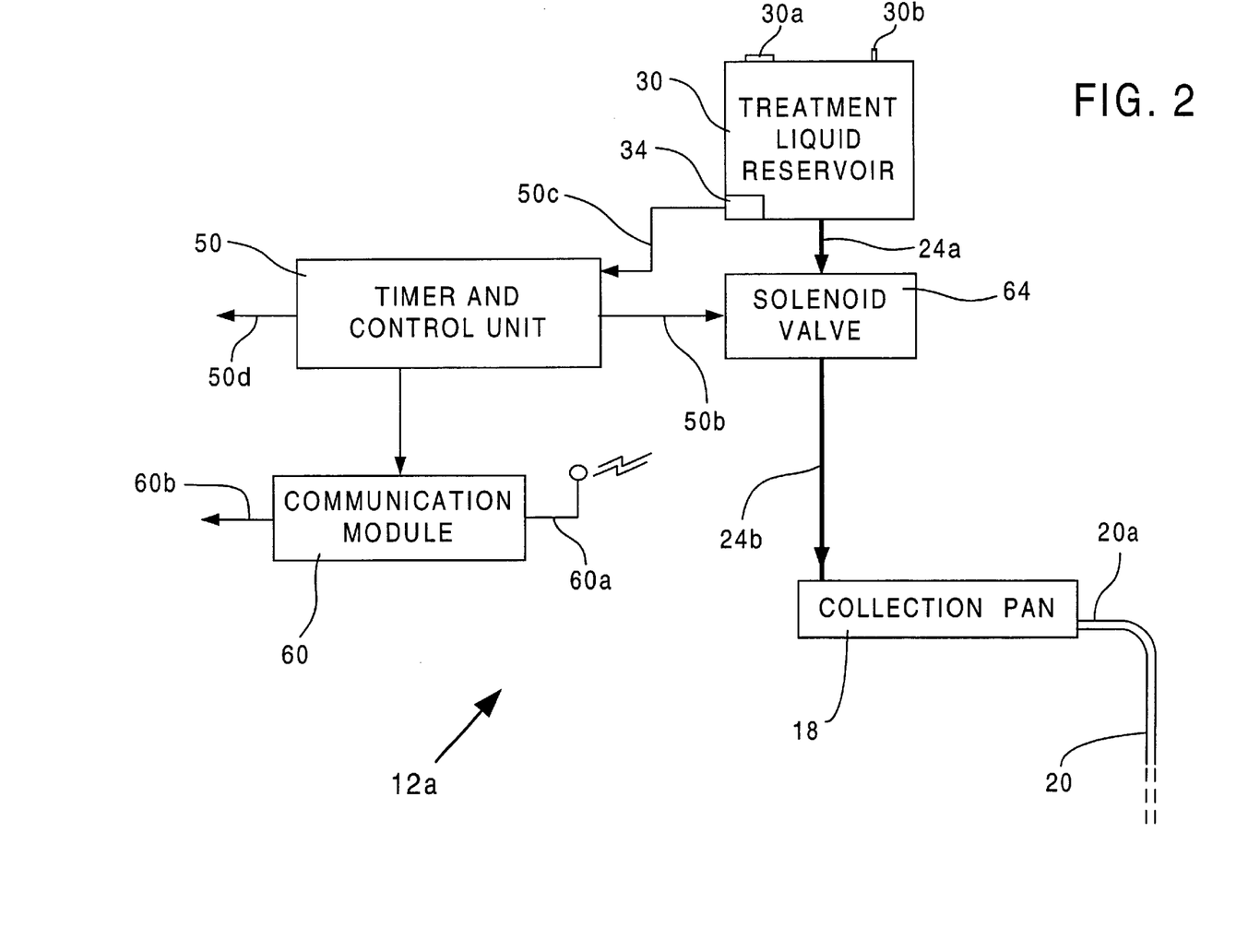
FIG. 2 is a high level block diagram of an embodiment of the present invention installed to automatically service a collection pan, and possibly associated structures, of a heat exchanger assembly such as that depicted in FIG. 1.

Turning now to FIG. 2, an embodiment of a treatment apparatus 12a of the invention is provided. A treatment liquid reservoir 30, which may be pressurized or elevated above a collection pan 18, is coupled to a first fluidic coupling 24a. Preferably the treatment liquid reservoir 30 is structured with a filler port 30a and possibly a pressurizing port 30b. The filler port 30a would be employed when filling or refilling the treatment liquid reservoir 30 to gain access to a fluid holding interior of the treatment liquid reservoir. The pressurizing port 30b, depicted in FIG. 2, will be discussed in greater detail below. The first fluidic coupling 24a is coupled to a solenoid valve 64. A second fluidic coupling 24b is further provided such that when the solenoid valve is activated or energized, a volume of treatment liquid is transferred from the treatment liquid reservoir 30 through the fluidic coupling 24a, the solenoid valve 64, and the second fluidic coupling 24b, to the collection pan 18. It may be noted that if a sufficient volume is transferred to the collection pan, the treatment liquid may actually, at least partially, clear and or clean the first end of the drain tube 20a. As appreciated by skilled persons, the first fluidic coupling 24a, as well as other included with this and other embodiments of the invention, may be provided by plastic or copper tubing. In addition, such fluidic couplings may include tubing means that may be termed a 'delivery tube' or 'delivery tubes'.

Returning to FIG. 2, it may be desirable to actually power down an apparatus of which the collection pan is a portion, so as to cause the production and flow of condensed fluid to cease or slow during a temporal interval after which the treatment liquid has been transferred to and applied to the collection pan 18. For example, when the treatment apparatus 12a is installed for use in periodically treating a collection pan of an air-conditioning (A/C) system, it may be advantageous to power down the A/C system, for a predetermined interval, at a time when the treatment liquid is transferred to the collection pan 19 for treatment thereof. This powering down, which may be desirable in order to give the treatment liquid time to breakdown any contaminants present without additional condensed fluid being produced that may dilute the treatment liquid, may be facilitated by a control signal 50d from a timer and control unit 50.

The timer and control unit 50 depicted in FIG. 2 is included for causing a periodic activating of a solenoid valve 64 via a signal 50b. Once solenoid valve 64 is activated, a transferring of a pre-selected volume treatment liquid from the treatment liquid reservoir 30 to the collection pan 18 is realized. Accordingly, embodiments of the present invention may be said to employ a "means to enable a periodic transfer of a volume of treatment liquid from the treatment liquid reservoir 30 via one or more delivery tubes into a collection pan 18".

Figure 3:
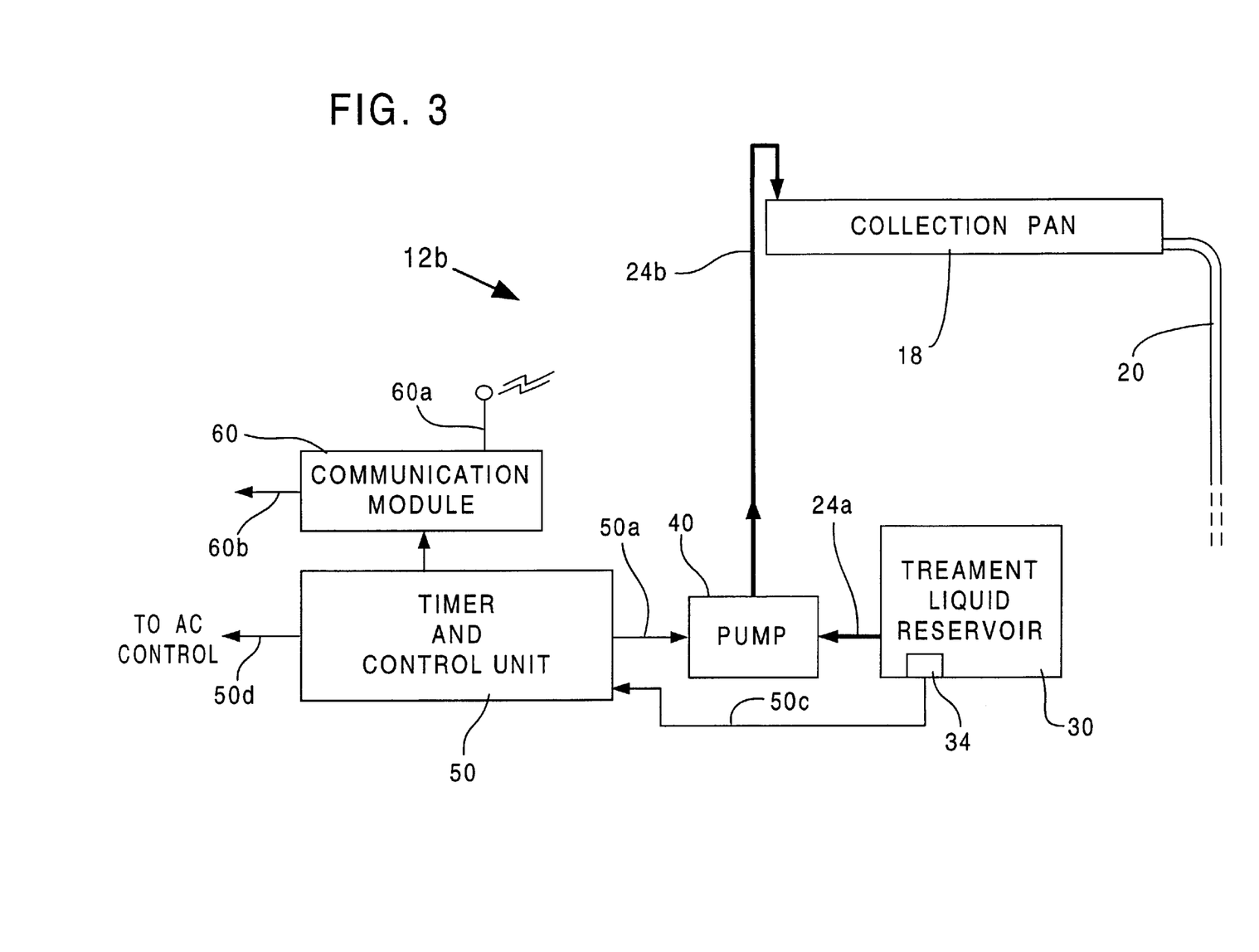
FIGS. 3 and 4 provides high level block diagrams of other preferred embodiments of the invention.

Referring now to FIG. 3, an embodiment of the treatment apparatus 12b of the invention is depicted that is structured with a pump 40. As such, additional preferred embodiments of the invention may include as a portion of the "means to enable a periodic transfer of a volume of treatment liquid from the treatment liquid reservoir 30 via one or more delivery tubes into a collection pan 18", an active element such as a pump. The pump 40 of FIG. 3 is responsive to the timer and control unit 50 and may be energized by way of signal 50a. As illustrated, an input to the pump unit 40 is fluidically coupled to the treatment liquid reservoir 30 by a first fluidic coupling 24a for enabling a drawing of treatment liquid from the treatment liquid reservoir 30, preferably for a pre-selected temporal interval. A second fluidic coupling 24b, which may form at least a portion of a delivery tube, is employed to enable treatment liquid drawn from the treatment liquid reservoir 30 to be delivered to the collection pan 18, as depicted. It is important to understand, that items such as the solenoid valve 64 depicted in FIG. 1, or suitable check-valves, may be included inline with the first fluidic coupling 24a or the second fluidic coupling 24b of FIG. 3, if needed.

When considering the operation of the embodiment of FIG. 3, at a point in time when it is determined that a transferring of a volume of treatment liquid to the collection pan 18 is required, the timer and control unit 50 may be arranged to energize the pump 40, say by way of a control signal 50a, for a pre-selected temporal interval. This energizing of the pump 40, which is substantially equivalent to the activating of the solenoid valve 64 of FIG. 2, results in the transferring of a volume of treatment liquid from the treatment liquid reservoir to the collection pan 18.

Figure 4:
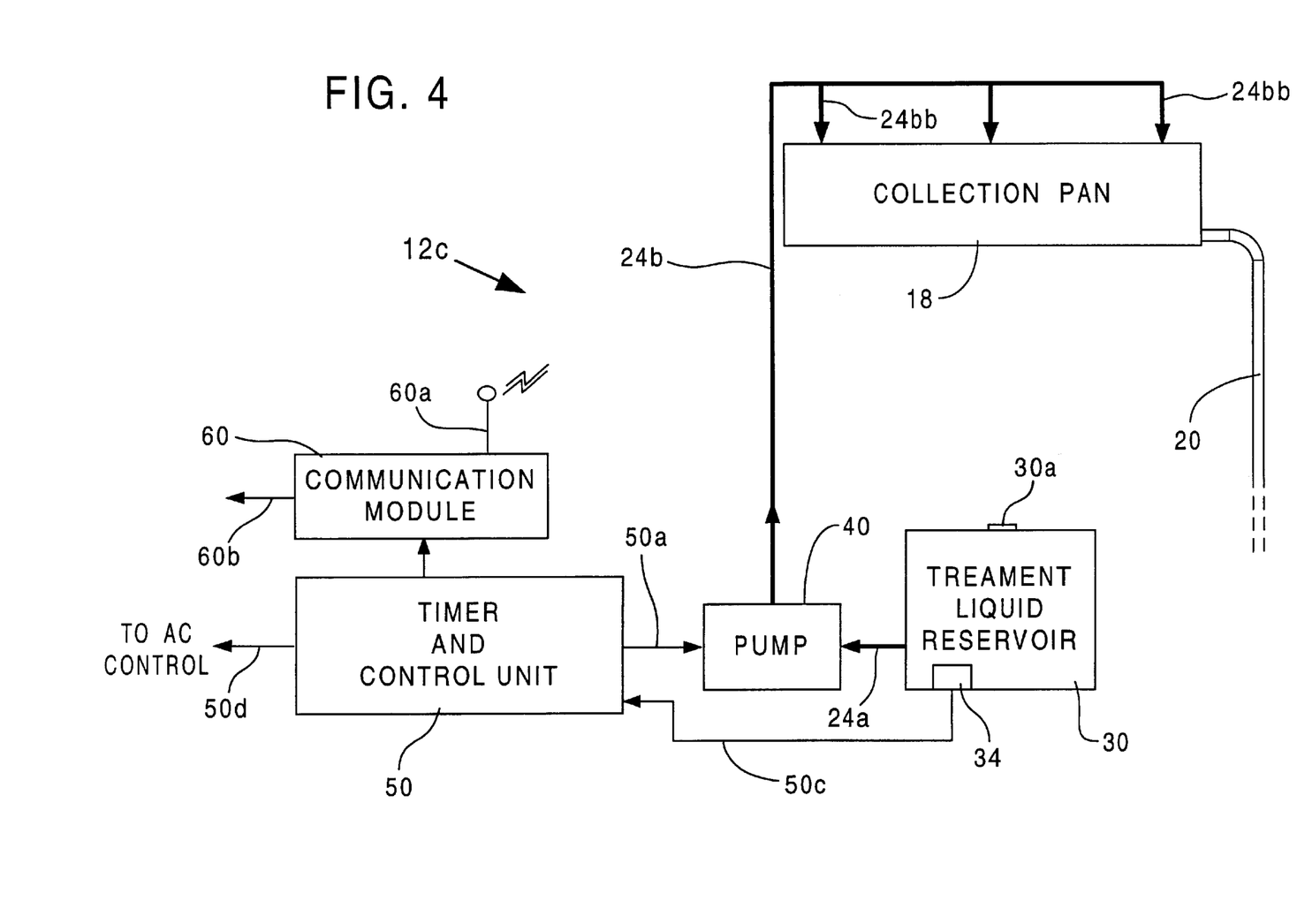

As can be seen in FIGS. 2 through 4, preferred embodiments of the present invention may include a treatment liquid reservoir 30 that is configured to produce a signal 50c, which may be a simple binary signal. The signal 50c is most preferably coupled to the timer and control unit 50, as shown, to indicate when a level or volume of treatment liquid remaining in the treatment liquid reservoir 30 reaches a pre-selected minimal level. At that point in time (wherein a minimal level is detected), a communication module 60 may be employed for contacting a remote location for placing a request for a refilling of the treatment liquid reservoir 30. As depicted, the communication module 60 may establish a connection to the remote location by either a wireless connection 60a, or a hard-wired connection 60b, or other connections providable by skilled persons. It may be noted that in order for the level of the treatment liquid to be monitored so that a low level situation may be detected, a low liquid level detector 34 must be included. Typical level detection arrangements may be provided by a simple float mechanism, an optical means, an acoustic arrangement, etc. Regardless of the specific low liquid level detector 34 employed, a signal 50c is most preferably operatively coupled to the timer and control unit 50. Once a low liquid level situation is detected and indicated via signal 50c, the timer and control unit 50 utilizes the communication module 60 for contacting the remote location. Alternately, the signal 50c may be coupled directly to the communication module 60.

Turning now to FIG. 4, there is provided another preferred embodiment of the heat exchanger treatment apparatus 12c of the invention. The treatment liquid reservoir 30, fluidic couplings 24a and 24b, timer and control unit 50, and the communication module 60, may each be operated as discussed above when referring to FIG. 3. However, the pump 50 now transfers and delivers treatment liquid to the collection pan 18 at a plurality of locations (e.g., 24bb). This may provide a more even distribution of treatment liquid to the collection pan 18, and reduce the time required to dissolve or breakup the contaminants therein.

When considering the embodiments of FIGS. 2 through 4, and equivalents thereof, it may be noted that a flowing of treatment liquid from the treatment liquid reservoir 30 to the collection pan 18 may be caused by at least one of:

the locating of the treatment liquid reservoir 30 in an elevated relative position with respect to the collection pan 18. This arrangement, which is depicted in FIG. 2, may be termed a gravity feeding arrangement for transferring treatment liquid from the treatment liquid reservoir to the collection pan (for example, when a solenoid valve 64 is energized);

pressurizing the treatment liquid reservoir 30 such that when the solenoid valve is energized treatment liquid flows under pressure from the treatment liquid reservoir 30 and into fluidic coupling 24a; and energizing a pump 40 to draw treatment liquid from the treatment liquid reservoir 30 and delivering the treatment liquid to the collection pan 18.

It may be noted that if the treatment liquid reservoir 30 is to be provided as a pressurized container the filling port 30a must provide a hermetic seal when closed, and a pressurizing port 30b may be provided to enable the treatment liquid reservoir 30 to be pressurized by an available source of pressurized air. As skilled persons will understand, the pressurizing port 30b, may be employed to pressurize the treatment liquid reservoir 30 by a periodic coupling of a source of pressurized air (for example, each time the treatment liquid reservoir is refilled). Alternately, if a constant source of pressurized air is available, it may be coupled to the treatment liquid reservoir 30 on a full-time basis. When employing this latter arrangement, a means must be provided to enable the pressurized source to be shut off or removed during re-filling operations.

It is important to understand that the timer and control unit 50 may be a relatively complicated electronic module that may further include a user interface (not explicitly illustrated). A large variety of configurations of the timer and control unit 50 and the user interface (not explicitly shown) may be provided by skilled persons that have completed a review of this disclosure. A most preferred embodiment of a user interface is preferably provided as a portion of the timer and control unit 50 and is arranged for exchanging information therewith. As such, these preferred embodiments of the user interface may include one or more keyswitches, toggle switches, and or pushbuttons, along with one or more display and or annunciator elements. Such a user interface may be included for enabling one or more operating parameters to be set by an authorized individual or service person. Typical operating parameters may include at least one of:

an amount or volume of liquid to be periodically transferred to the collection pan;

a temporal interval that must expire before applying a next volume of treatment liquid;

a number of hours an apparatus, of which the heat exchanger is a portion, must be operating before transferring the next volume of treatment liquid;

how long before treatment fluid is transferred to the collection pan an apparatus (of which the collection pan is a portion) should be powered down; and a remote location to be contacted should the volume of treatment liquid remaining in the treatment liquid reservoir reach a pre-selected minimal level, thereby indicating a need for refilling.

Figure 5:
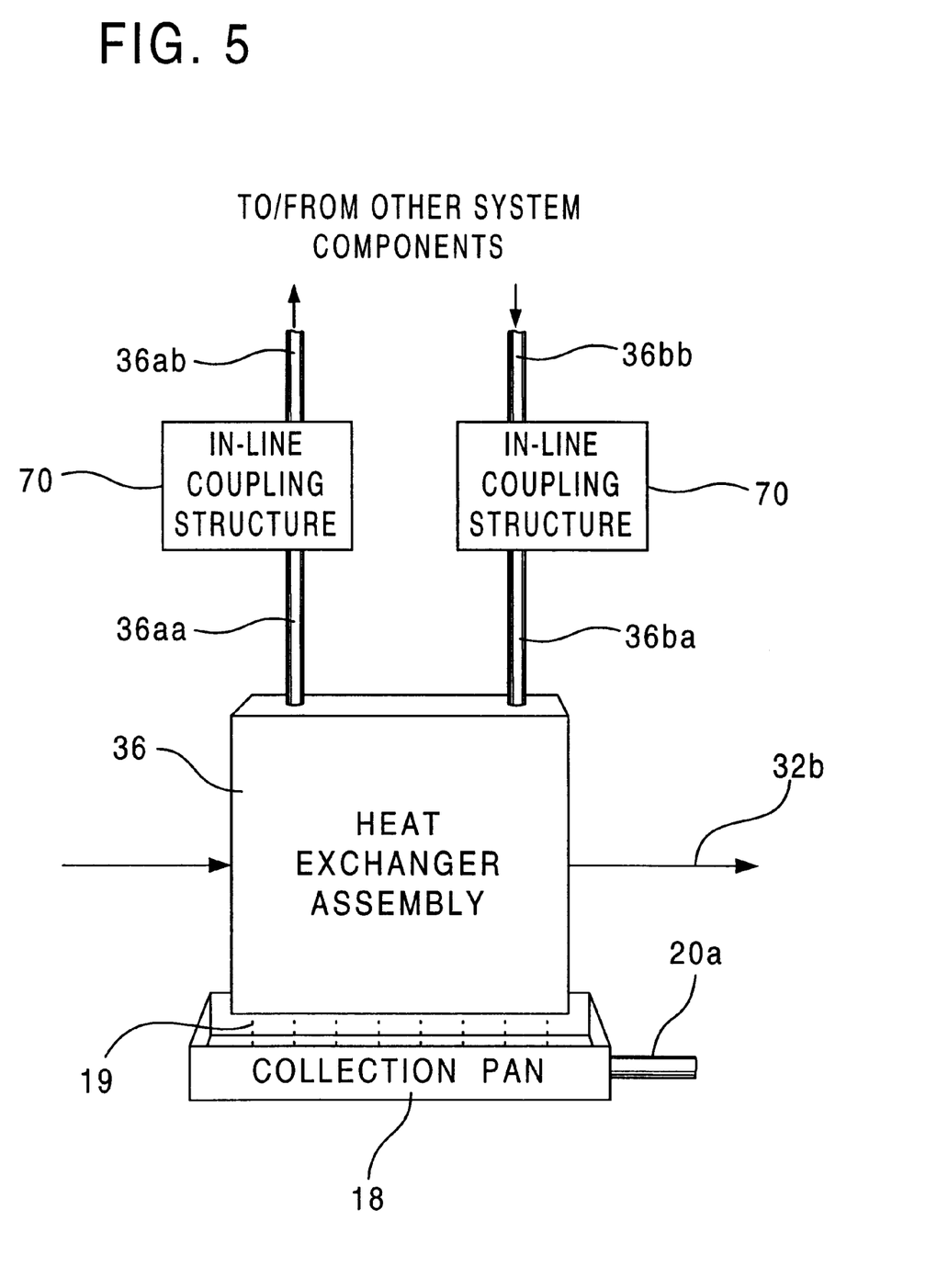
FIG. 5 illustrates a service oriented advanced in-line coupling structure installed in fluidic couplings of a heat exchanger assembly.
Figure 6A:
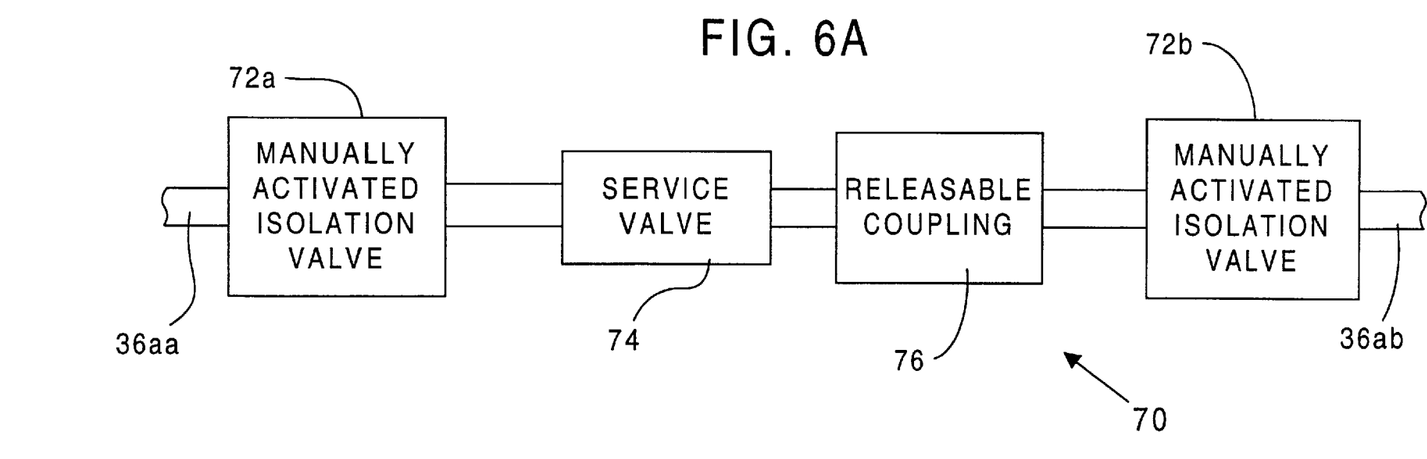
FIGS. 6A and 6B depict a preferred embodiment of one possible coupling structure in accordance with the invention installed in a fluidic coupling, which may, for example, be exemplified by a pressure line of a heat exchanger.
Figure 6B:
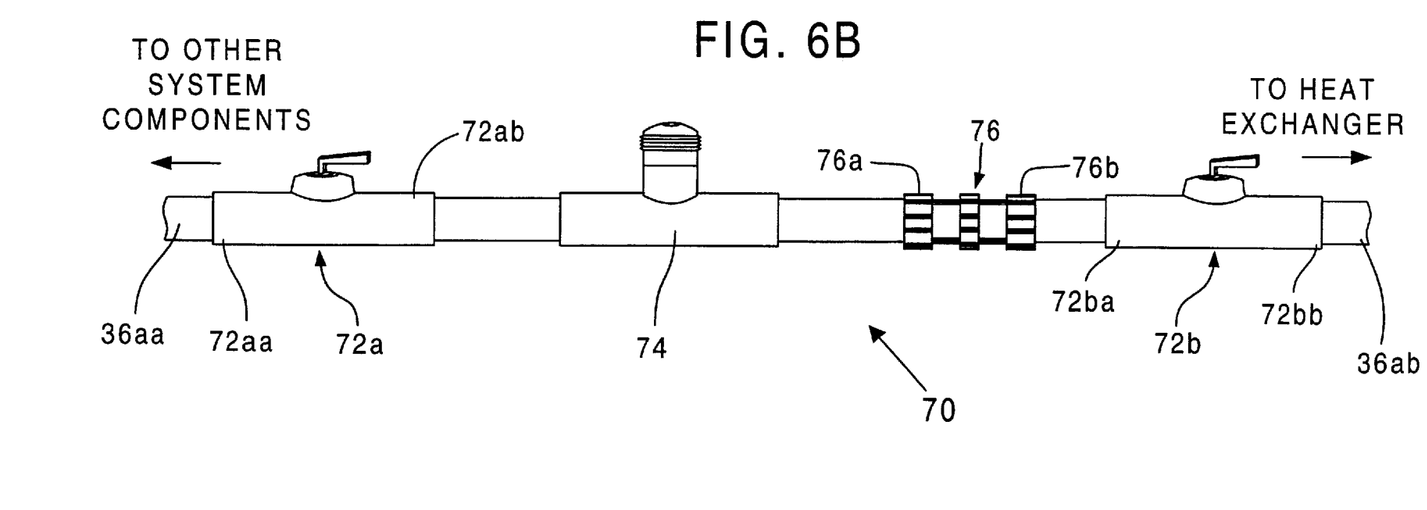

Turning now to FIGS. 5, 6A and 6B, another aspect of the invention is illustrated. As shown in FIG. 1, a heat exchanger assembly 36 may include a plurality of pressurized fluidic couplings or coupling lines designated 36a and 36b. The fluidic couplings 36a and 36b may be employed for coupling the heat exchanger assembly 36 to other portions of a larger apparatus, such as compressor units, condenser coils, re-heat coils, etc. As service and repair persons will understand, it is often desirable to be able to seal either one or both of the fluidic couplings 36a and or 36b, as well as uncouple and separate them as needed. For example, when considering the heat exchanger assembly 36, it may be most desirable to be able to seal each fluidic coupling 36a and 36b, when it suspected that a slow leak has developed in the heat exchanger assembly. If the leak is indeed determined to be in the heat exchanger assembly 36, a means to uncouple the assembly from the remainder of a larger apparatus, while the fluidic couplings are sealed off, would be most desirable.

As depicted in FIG. 5, the inclusion of an advanced in-line coupling structure may be provided to fulfill these needs. That is, the coupling structure 70 may be employed in-line with each of a plurality of fluidic couplings such as 36a and 36b connected to a heat exchanger assembly 36 for enabling an isolating and or quick disconnecting of each fluidic coupling for servicing and repair. It may be noted that once the in-line coupling structure 70 is installed in a fluidic coupling 36a, the coupling segments on each side of the in-line coupling structure 70 may be referred to as 36aa and 36ab, as illustrated in FIG. 5. A preferred coupling structure 70, as shown in FIGS. 6A and 6B, includes a series arrangement of an isolation valve 72a, a releasable coupling means 76 and most preferably a second isolation valve 72b. The inclusion of at least one isolation valve 72a, which may be provided by a simple ball-type valve, provides an isolating function for testing and sealing purposes.

As clearly seen in FIG. 6B, a most preferred embodiment of the in-line coupling structure 70 is configured with a first isolation valve 72a having a first port 72aa and a second port 72ab, with the first port 72aa fixed to a first side of a fluidic coupling 36aa. The releasable coupling means 76 is structured having a first portion 76a that may be fixed and operatively coupled to the second port 72ab of the first isolation valve 72a. A second isolation valve 72b is arranged having a first port 72ba and a second port 72bb. As depicted, the first port 72ba may be fixed to a second portion 76b of the coupling means 76, with the second port 72bb coupled to a second side of fluidic coupling 36ab. The releasable coupling means 76 is structured such that the first portion 76a and second portion 76b may be readily and repeatedly coupled and uncoupled, as needed. Accordingly, when the first and second portions, 76a and 76b respectively, are coupled a leak-free (hermetic) fluidic coupling is established. When uncoupled, the first and second portions 76a and 76a of the coupling means 76 may be readily separated. Importantly, each isolation valve 72a and 72b depicted in FIGS. 6A and 6B is arranged to be placed in one of an open position wherein fluid may flow through the isolation valve from port to port, or in a closed position thereby blocking the flow of fluid and isolating one side of the fluidic coupling into which the valve is installed. This provides the 'isolating' and 'sealing off' functions of the present invention.

As clearly shown in FIG. 6A and FIG. 6B, a service valve 74 may be included and interposed in-line between either the first or second isolation valve, 72a and 72b respectively, and the first or second portion of the coupling means, 76a or 76b respectively. As appreciated by skilled persons, the inclusion of such a service valve 74 is desirable for filling and testing purposes.

While there have been described a plurality of the currently preferred embodiments of the present invention, and equivalents thereto, those skilled in the art will recognize that other and further modifications may be made without departing from the spirit of the invention. It is certainly intended to claim all modifications and variations within the scope of the invention and the appended claims.

What is claimed is:

1. A treatment apparatus structured for periodically delivering a pre-selected volume of treatment liquid to a fluid collection pan, the apparatus comprising:

(a) a treatment liquid reservoir, the reservoir being elevated above the collection pan of the apparatus;

(b) at least one fluidic coupling;

(c) means to enable a periodic transfer of a volume of treatment liquid from the treatment liquid reservoir to the collection pan by way of the fluidic couplings, wherein the treatment liquid is transferred to the collection pan for treating the collection pan, preventing a clogging thereof, and the means includes:

i. a timer and control unit, and ii. a solenoid valve that is responsive to the timer and control unit such that periodically at pre-determined intervals the timer and control unit cause an energizing of the solenoid valve enabling a flowing of a pre-selected volume of treatment liquid from the treatment liquid reservoir through the fluidic couplings to the collection pan at a preselected interior location thereof; and (d) a plurality of delivery tubes provided to deliver treatment liquid to a plurality of locations about the collection pan.

2. The treatment apparatus in accordance with claim 1, wherein the means to enable a periodic transfer of a volume of treatment liquid from the treatment liquid reservoir to the collection pan includes a pump.

3. The treatment apparatus in accordance with claim 2, wherein the timer and control unit includes a user interface enabling operating parameters to be set by an authorized individual.

4. The treatment apparatus in accordance with claim 3, wherein settable operating parameters includes at least one of:

(a) the actual volume of liquid to be periodically transferred to the collection pan;

(b) a temporal interval that must expire before transferring a next volume of treatment liquid;

(c) a number of hours an apparatus, of which the collection pan is a portion, must be operating before transferring the next volume of treatment liquid to the collection pan;

(d) a remote location to be contacted should a volume of treatment liquid remaining in the treatment liquid reservoir reach a pre-selected minimal level, thereby needing to be refilled; and (e) whether an apparatus, of which the collection pan is a portion, should be powered down for a predetermined temporal interval when a volume of treatment liquid is transferred and applied for treating the collection pan.

5. A treatment apparatus structured to periodically apply a pre-selected volume of treatment liquid via at least one delivery tube to a collection pan, causing a treating of the collection pan, the treatment apparatus comprising:

(a) at least one delivery tube structured to receive and deliver a volume of treatment liquid to the collection pan;

(b) a treatment liquid reservoir, the reservoir located in an elevated position with respect to the collection pan, thereby employing in part a gravity feeding arrangement for transferring treatment liquid from the treatment liquid reservoir to the collection pan;

(c) a timer and control unit, the timer and control unit programmed for periodically causing, at predetermined intervals, the energizing of the solenoid valve and a transferring of the pre-selected volume treatment liquid; and (d) a solenoid valve, which is responsive to the timer and control unit, and fluidically coupled for periodically enabling a flowing of treatment liquid from the treatment liquid reservoir through the delivery tube to the collection pan.

6. The treatment apparatus in accordance with claim 5, wherein the treatment liquid reservoir is pressurized so that when the solenoid valve is energized treatment liquid flows under pressure from the treatment liquid reservoir.

7. The treatment apparatus in accordance with claim 5, wherein a low liquid level detector is operatively coupled to the timer and control unit for determining when a volume of treatment liquid remaining in the treatment liquid reservoir reaches a pre-selected minimal level, causing a remote location to be contacted to request a refilling of the treatment liquid reservoir.

* * * * *